United States Patent
Yang et al.

(10) Patent No.: US 8,718,447 B2
(45) Date of Patent: May 6, 2014

(54) METHOD AND APPARATUS FOR PROVIDING MULTIMEDIA DATA USING EVENT INDEX

(75) Inventors: Gyung-hye Yang, Seoul (KR); Seung-Nyung Chung, Seoul (KR); Ki-wan Choi, Anyang-si (KR); Myung-hyun Yoo, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1330 days.

(21) Appl. No.: 11/525,896

(22) Filed: Sep. 25, 2006

(65) Prior Publication Data

US 2007/0088833 A1   Apr. 19, 2007

(30) Foreign Application Priority Data

Oct. 17, 2005   (KR) .......................... 10-2005-0097595

(51) Int. Cl.
*H04N 5/93* (2006.01)
*H04N 5/77* (2006.01)
*H04N 9/80* (2006.01)
*G09B 19/20* (2006.01)

(52) U.S. Cl.
USPC ........... 386/278; 386/224; 386/227; 386/248; 434/236

(58) Field of Classification Search
None
See application file for complete search history.

(56) References Cited

U.S. PATENT DOCUMENTS

| | | | |
|---|---|---|---|
| 6,585,521 B1* | 7/2003 | Obrador | 434/236 |
| 6,798,461 B2 | 9/2004 | Shapira | |
| 6,905,470 B2* | 6/2005 | Lee et al. | 600/500 |
| 7,177,872 B2* | 2/2007 | Schwesig et al. | 1/1 |
| 2003/0009078 A1* | 1/2003 | Fedorovskaya et al. | 600/26 |
| 2003/0063222 A1 | 4/2003 | Creed et al. | |
| 2003/0118974 A1 | 6/2003 | Obrador | |
| 2003/0131351 A1 | 7/2003 | Shapira | |
| 2004/0128308 A1* | 7/2004 | Obrador | 707/102 |
| 2006/0184538 A1* | 8/2006 | Randall et al. | 707/10 |
| 2008/0243332 A1* | 10/2008 | Basir et al. | 701/35 |

FOREIGN PATENT DOCUMENTS

| | | |
|---|---|---|
| JP | 2002-204419 | 7/2002 |
| JP | 2004-159192 | 6/2004 |
| JP | 2005-128884 | 5/2005 |
| KR | 2003-0001363 | 1/2003 |

OTHER PUBLICATIONS

Korean Office Action issued on Nov. 20, 2006, with respect to Korean Application No. 10-2005-0097595, which corresponds to the above-referenced application.
Lockerd et al. "LAFCam-Leveraging Affective Feedback Camcorder".
Office Action issued in corresponding Korean Patent Application No. 10-2006-0041704, on Aug. 24, 2007.

* cited by examiner

*Primary Examiner* — Heather Jones
(74) *Attorney, Agent, or Firm* — Staas & Halsey LLP

(57) ABSTRACT

A method and apparatus for providing multimedia data using an event index are provided. The method includes; to detect a biometric signal of a user when the user captures a multimedia data, digitize the detected biometric signal and indexing the multimedia data using the result of the digitization, and selectively edit the indexed multimedia data and playing back the result of the selectively editing. Accordingly, it is possible to facilitate the management of moving data files by indexing part of a moving data corresponding to an emotional event of a user who has captured the moving data, editing the moving data according to the results of the indexing, and playing back the edited moving data to provide a preview of the moving data.

49 Claims, 11 Drawing Sheets

METHOD AND APPARATUS FOR PROVIDING MULTIMEDIA DATA USING EVENT INDEX

CROSS-REFERENCE TO RELATED APPLICATION

This application claims priority from Korean Patent Application No. 10-2005-0097595 filed on Oct. 17, 2005, in the Korean Intellectual Property Office, the disclosure of which is incorporated herein by reference in its entirety.

BACKGROUND OF THE INVENTION

1. Field of the Invention

The present invention relates to a method and apparatus for providing a multimedia data using an event index, and more particularly, to a method and apparatus for providing a multimedia data using an event index in which a biometric signal of a user is detected when the user captures a moving image, the moving image is indexed using the detected biometric signal, and the indexed moving image is selectively edited and/or played back. It is understood that the invention can apply to not only image signal but also audio signal. Further, multimedia data includes audio and/or video data.

2. Description of the Related Art

Portable moving image recording/reproducing apparatuses such as camcorders, digital cameras, and portable terminals not only can capture still/moving images of subjects but also can record the captured still/moving images. Thus, users of such portable moving image recording/reproducing apparatuses can capture images of subjects and record the captured images even when moving from one place to another, and can reproduce, and can play back the recorded images later. Users may use display devices embedded in moving image recording/reproducing apparatuses, personal computer (PC) monitors, or other external display devices such as television (TV) monitors to watch moving images recorded by portable moving image recording/reproducing apparatuses.

Since it generally takes time to watch all moving images recorded by users, the users are likely to edit the recorded moving images by choosing only those which are relatively meaningful. During the editing of the recording moving images, the user may detect their emotions or biometric signals as they watch the recording moving images and then index the recorded moving images using the detected emotions or biometric signals so that the recording moving images can be selectively watched later by people other than the users according to the results of the indexing. Examples of this type of method of indexing multimedia data are disclosed in U.S. Patent Published Application No. 2003-0131351 and U.S. Pat. No. 6,585,521. Such conventional multimedia data indexing methods, however, do not provide ways to choose moving images which are deemed meaningful to users according to emotional/physical state information of the users. In general, in order to detect users' emotional feedback on moving images, a complicated sensing operation must be performed for a long time, and combinations of a variety of signals are needed. Thus, it is difficult to detect the emotional states of the users within a short time using conventional methods involving the use of one type of sensors.

Therefore, it is necessary to develop methods and apparatuses to provide multimedia data which can detect a biometric signal of a user when the user captures a moving image, index part of the moving image corresponding to an emotional event, edit the moving image according to the results of the indexing, and automatically provide a preview of the edited moving image.

SUMMARY OF THE INVENTION

Additional aspects and/or advantages of the invention will be set forth in part in the description which follows and, in part, will be apparent from the description, or may be learned by practice of the invention.

The present invention provides a method and apparatus to provide multimedia data using an event index which can facilitate the management of moving image files by indexing part of a moving image corresponding to an emotional event of a user who has captured the moving image, editing the moving image according to the results of the indexing, and playing back the edited moving image to provide a preview of the moving image.

However, the aspects of the present invention are not restricted to the one set forth herein. The above and other aspects of the present invention will become more apparent to one of daily skill in the art to which the present invention pertains by referencing a detailed description of the present invention given below.

According to an aspect of the present invention, there is provided a method of providing multimedia data using an event index. The method includes detecting a biometric signal of a user when the user captures a multimedia data, digitizing the detected biometric signal and indexing the multimedia data using the result of the digitization, and editing the indexed multimedia data and playing back the result of the editing.

According to another aspect of the present invention, there is provided an apparatus for providing multimedia data using an event index. The apparatus includes a biometric signal detection unit which detects a biometric signal of a user when the user captures multimedia data, an indexing unit which digitizes the detected biometric signal and indexes the multimedia data using the result of the digitization, and playback unit which edits the indexed multimedia data and plays back the result of the editing.

According to yet another aspect of the present invention, the playback unit selectively edits the indexed multimedia data and plays back the result of the selective editing.

In still another aspect of the present invention, the multimedia data is multimedia image.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
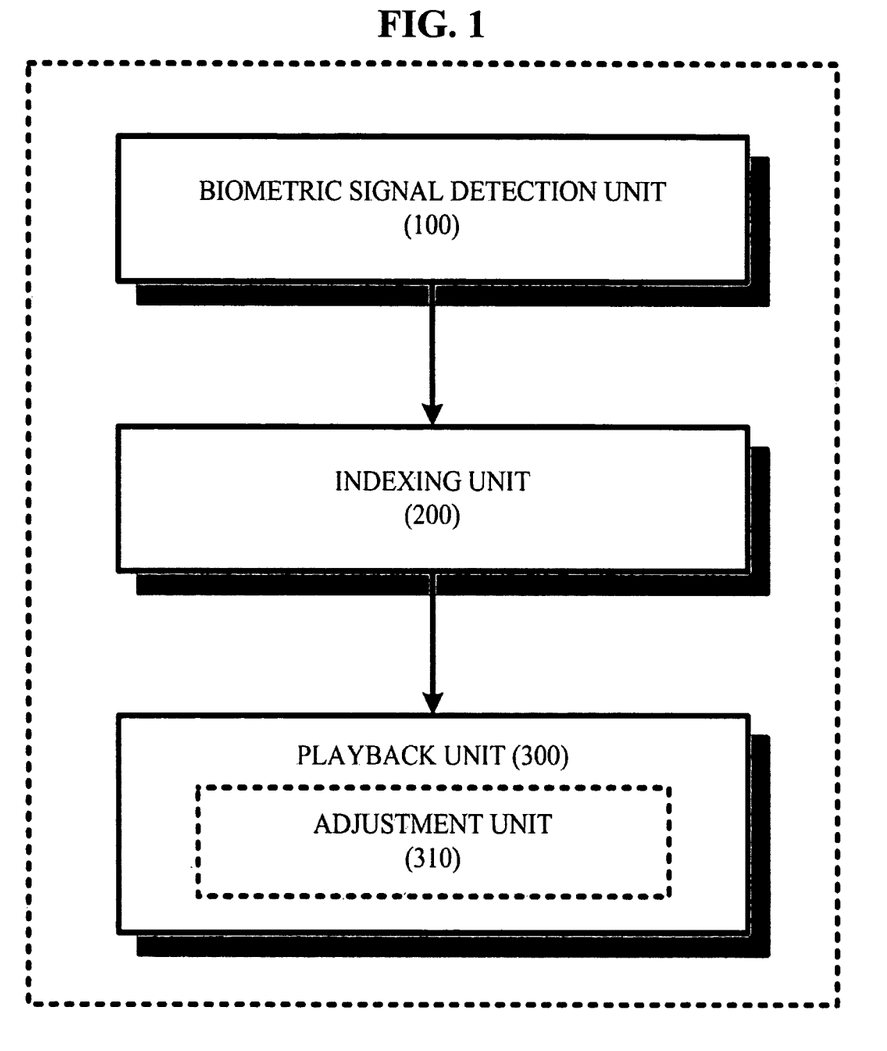
FIG. 1 is a block diagram of an apparatus to provide multimedia data using event indexes according to an embodiment of the present invention.

FIG. 1 is a block diagram of an apparatus to provide multimedia data using event indexes according to an embodiment of the present invention. Referring to FIG. 1, the apparatus includes a biometric signal detection unit 100, an indexing unit 200, and a playback unit 300.

Figure 6A:
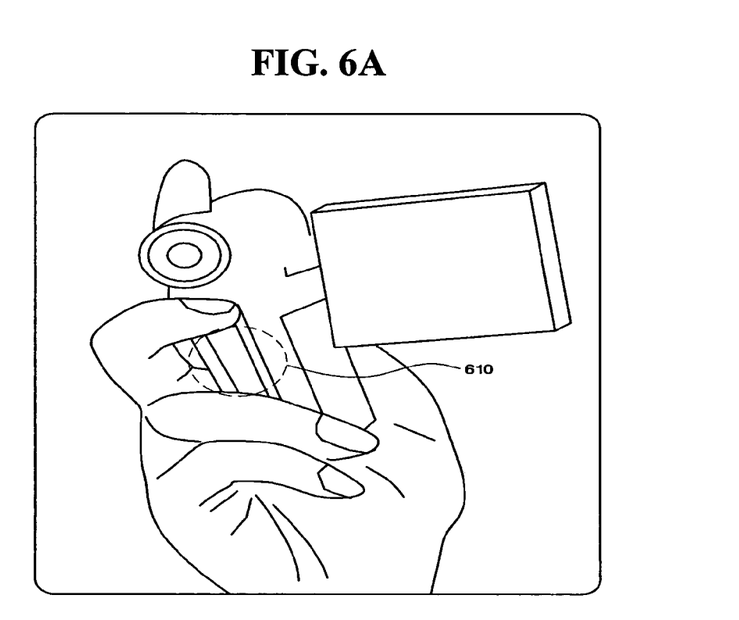
FIGS. 6A and 6B are diagrams to explain the detection of a biometric signal of a user by the apparatus illustrated in FIG. 1 according to an embodiment of the present invention.
Figure 6B:
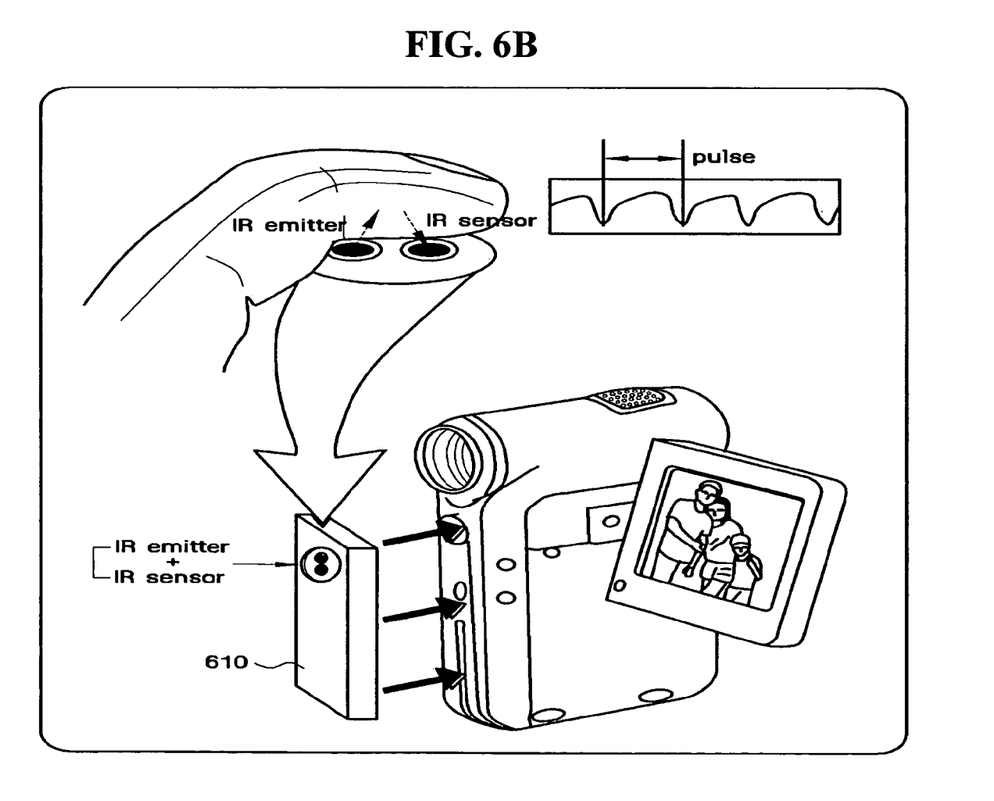

The biometric signal detection unit 100 detects a biometric signal of a user when the user captures a multimedia data. The biometric signal detection unit 100 may use a photoplethysmography (PPG) sensor 610, which is synchronized with a button used for capturing the multimedia data, to detect a biometric signal from the user. A person's pulse wave is a type of waveform that is transmitted through the entire body of the person as an effect of the heartbeat. In order to detect a pulse wave from the peripheral arteries of the user, infrared (IR) rays can be used as a light source. IR rays are more readily absorbed by blood than by tissues, and thus, IR rays have been widely used to determine the amount of blood in parts of the human body. FIGS. 6A and 6B explain the detection of a biometric signal of a user by the apparatus illustrated in FIG. 1. Specifically, FIG. 6A illustrates a typical handgrip posture adopted by a user when the user captures a moving image with a moving image recording/reproducing apparatus such as a camcorder. Referring to FIG. 6A, the user touches a PPG sensor 610, which senses a biometric signal of the user, with his/her index finger. FIG. 6B is an expanded view of the PPG sensor 610 illustrated in FIG. 6A. Referring to FIG. 6B, an IR emitter radiates an IR ray. Then the IR ray is partially absorbed by blood in the index finger of the user and is partially reflected by the index finger of the user. The remaining IR ray is detected by an IR sensor. The variation in the amount of blood in the index finger of the user can be determined based on the results of the detection performed by the IR sensor.

The indexing unit 200 digitizes the biometric signal detected by the biometric detection unit 100, and indexes the multimedia data using the digitized biometric signal. The structure and operation of the indexing unit 200 will hereinafter be described in further detail with reference to FIG. 2.

Figure 2:
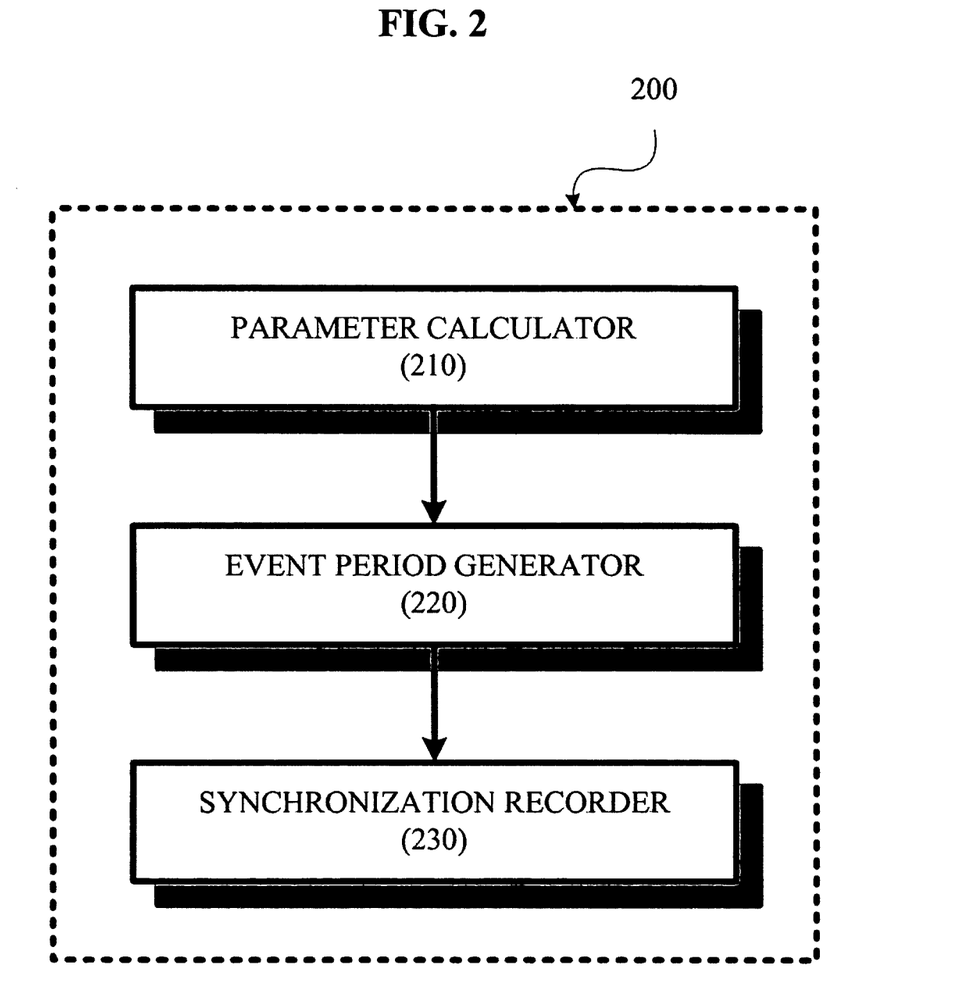
FIG. 2 is a block diagram of an indexing unit illustrated in FIG. 1.

FIG. 2 is a block diagram of the indexing unit 200 illustrated in FIG. 1. Referring to FIG. 2, the indexing unit 200 includes a parameter calculator 210, an event period generator 220, and a synchronization recorder 230.

The parameter calculator 210 digitizes the biometric signal detected by the biometric signal detection unit 100 and calculates a plurality of signal processing parameters based on the result of the digitization. Examples of the signal processing parameters include heartbeat rate (HR); a high frequency (HF) spectral component and a low frequency (LF) component of heartbeat fluctuations; HF/LF ratio, which is a measure of activation of the human body; SDNN03, which is a standard deviation of heartbeat intervals within three seconds; and SDNN10, which is a standard deviation of heartbeat intervals within ten seconds. HF is a power spectrum density (PSD) of a 0.15 Hz-to-0.4 Hz frequency domain and is considered as an index of activation of the parasympathetic nerves. The changes in HF over time can be measured using a short Time Fourier Transform (STFT) method. LF is a PSD of a 0.04 Hz-to-0.15 Hz frequency domain and is considered as an index of activation of the sympathetic nerves. The changes in LF over time can be measured using the STFT method. According to an aspect of the present embodiment, one of a plurality of signal processing parameters is determined as an optimum signal processing parameter, and this will hereinafter be described in detail.

The event period generator 220 generates an emotional event period according to various experimental data. In detail, the event period generator 200 may determine the overlapping time period of a first interval before and after the peak value of a signal processing parameter is detected and a second interval before and after a user behavioral response (such as a facial response or a vocal response) to the multimedia data occurs as an emotional event period for the signal processing parameter if the corresponding overlapping time period meets a set of standards.

Here, the event period generator 220 may use a variety of sets of standards to determine an emotional event period for a predetermined signal processing parameter. According to an aspect of the present embodiment, the event period generator 220 may use three standards, i.e., standards 1 though 3, to determine an emotional event period for a predetermined signal processing parameter, and this will hereinafter be described in detail. According to standard 1, the overlapping time period of a first interval before and after the peak value of a signal processing parameter is detected and the second interval before and after a user behavioral response to the multimedia data occurs is determined as an emotional event period for the signal processing parameter if the interval between the time when the corresponding user behavioural response occurs and the time when the peak value of the signal processing parameter is detected is less than a first value. The first value can be appropriately determined in consideration that the time when a biometric signal is detected is not likely to coincide with the time when a user behavioral response occurs due to the properties of the human body. For example, the first value may be about 5 msec. According to standard 2, the overlapping time period of the first interval before and after the peak value of the signal processing parameter is detected and the second interval before and after the user behavioural response to the multimedia data occurs is determined as an emotional event period for the signal processing parameter if the corresponding user behavioural response occurs prior to the detection of the peak value of the signal processing parameter and the interval between the time when the corresponding user behavioural response occurs and the time when the peak value of the signal processing parameter is detected is less than a second value. The second value, like the first value, may be about 5 msec. According to standard 3, the overlapping time period of the first interval before and after the peak value of the signal processing parameter is detected and the second interval before and after the user behavioural response to the multimedia data occurs is determined as an emotional event period for the signal processing parameter if a predetermined valid signal has been detected for the signal processing parameter, unlike for other signal processing parameters. Most of the experimental data regarding SDNN10 meets all the three standards. Thus, SDNN10 may be chosen as an optimum signal processing parameter.

Referring to FIG. 2, the synchronization recorder 230 records the multimedia data in synchronization with the emotional event period determined by the event period generator 220, and this will hereinafter be described in further detail with reference to FIG. 7.

Figure 7:
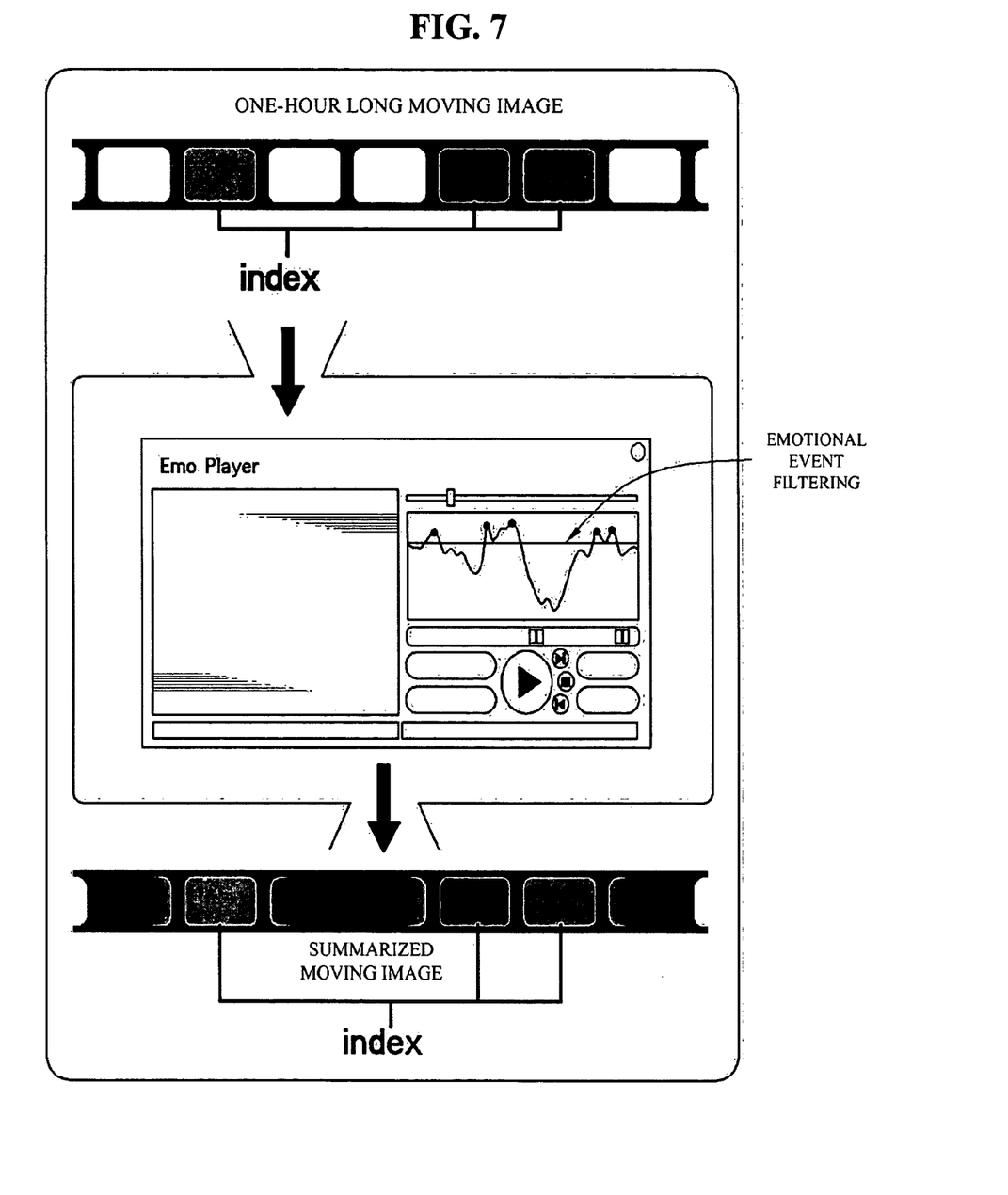
FIG. 7 is a diagram to explain the indexing and editing of multimedia data according to an embodiment of the present invention.

FIG. 7 is a diagram to explain the indexing and editing of a multimedia data according to an embodiment of the present invention. Specifically, the upper view of FIG. 7 illustrates a moving image, which is one hour long and is recorded in synchronization of an emotional event period of a user. A multimedia player filters out emotional events whose intensities are less than a predetermined value, generates an emotional event period using the remaining unfiltered emotional events, and synchronizes the moving image with the emotional event period. Portions of the moving image which are not included in the emotional event period may be deleted by the user, thereby obtaining a summary of the moving image. This process of editing moving image data is performed by the playback unit 300.

Referring to FIG. 1, the playback unit 300 selectively edits the multimedia data indexed by the indexing unit 200, and plays back the result of the editing. The playback unit 300 includes an adjustment unit 310 which determines how much of the indexed multimedia data is to be played back. Then the playback unit 300 plays back the indexed multimedia data according to the results of the determination performed by the adjustment unit 310.

In detail, the adjustment unit 300 may adjust a summarization level representing the ratio of the length of the emotional event period and the length of the indexed multimedia data using a graphic user interface (GUI) of a multimedia player, and this will hereinafter be described in detail with reference to FIG. 8.

Figure 8:
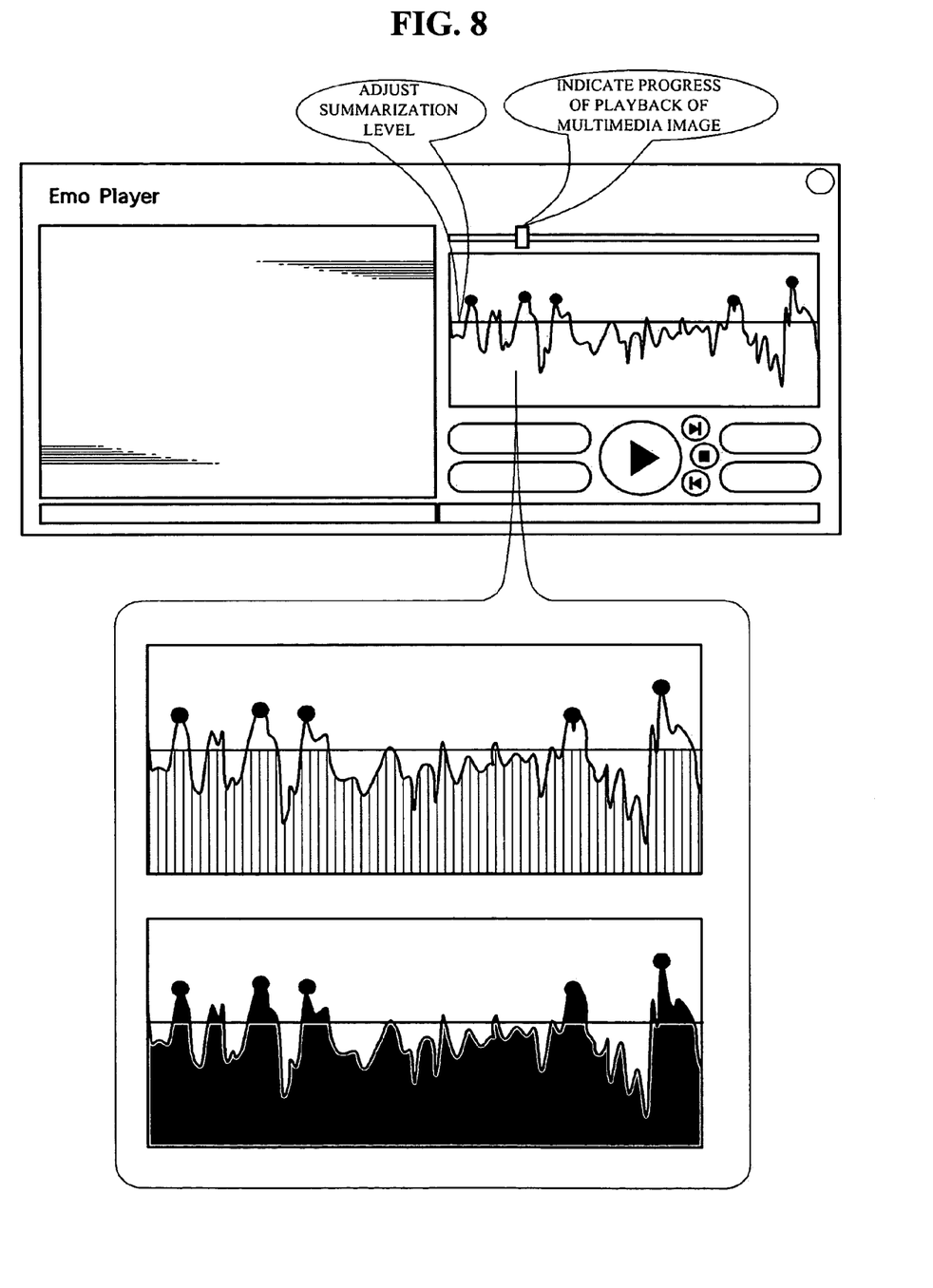
FIG. 8 is a diagram of a graphic user interface (GUI) of a multimedia player capable of adjusting a summarization level.

FIG. 8 is a diagram of a GUI of a multimedia player capable of adjusting a summarization level. Referring to FIG. 8, a summarization level for an emotional event signal waveform can be adjusted by using a horizontal line 920, which is located in the right half of the multimedia player, for example. The progress bar, like a progress bar of a typical multimedia player, indicates the progress of the playback of a multimedia data. According to an embodiment of the present invention, may display emotional intensity information can be displayed, thus enabling the adjustment of the summarization level according to emotional intensity, as illustrated in the FIG. 8. According to another embodiment of the present invention, emotional intensities by emphasizing the emotional intensities which are above the summarization level with dark colors may display, instead of displaying detailed individual peak information, as illustrated at 940 of FIG. 8.

Referring to FIG. 1, the adjustment unit 300 may gradually or discontinuously vary the ratio (hereinafter referred to as the playback portion-to-non-playback portion ratio) of the amount of part of a multimedia data to be played back and the amount of the remaining multimedia data not to be played back by adjusting the summarization level, wherein the playback portion-to-non-playback portion ratio can be represented by a progress bar of a multimedia player. This will hereinafter be described in detail with reference to FIG. 9.

Figure 9:
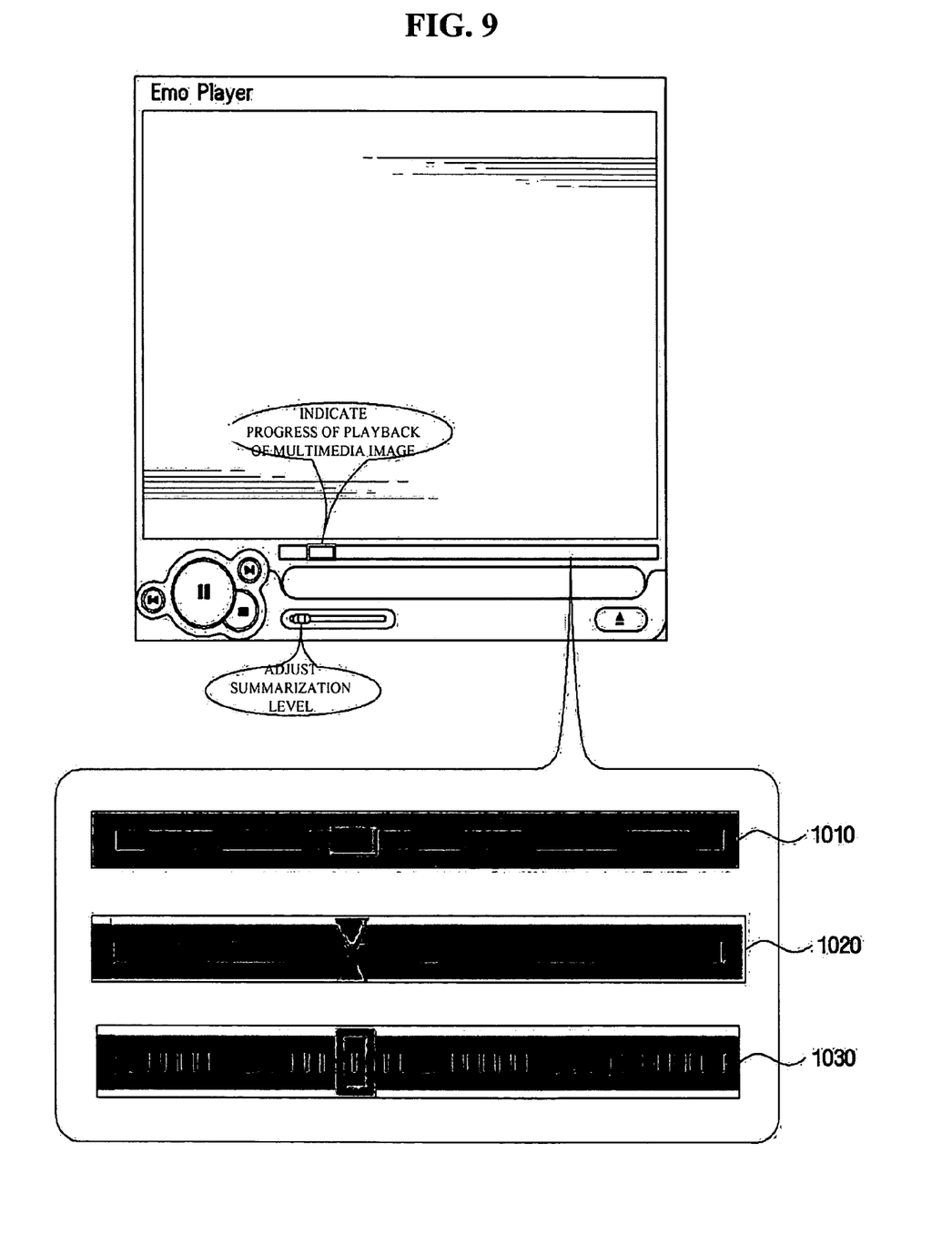
FIG. 9 is a diagram illustrating a GUI of a multimedia player and three progress bars and explains how a playback portion-to-non-playback portion ratio represented by each of the three progress bars can change according to a summarization level and how each of the three progress bars represents the changes in the playback portion-to-non-playback portion ratio.

FIG. 9 is a diagram illustrating a GUI of a multimedia player and three progress bars 1010 through 1030 and explains how a playback portion-to-non-playback portion ratio varies according to a summarization level and how each of the progress bars 1010 through 1030 represents the variation in the playback portion-to-non-playback portion ratio. Referring to FIG. 9, the progress bar 1010 renders multimedia data portions to be played back bright, and renders multimedia data portions not to be played back dark. When a summarization level is determined, the ratio between a bright area and a dark area displayed in the progress bar 1010 varies accordingly. The progress bar 1020, unlike the progress bar 1010, represents emotional intensities as a gradation of shades. When a summarization level is determined by a user, the pattern of the gradation of shades displayed in the progress bar 1020 varies accordingly. The third progress bar 1030 is similar to the progress bar 1020 in terms of representing emotional intensities using various shades of a color. However, the third progress bar 1030 represents emotional intensities using a discontinuous gradation of shades whereas the second progress bar 1020 represents emotional intensity variations using a continual gradation of shades.

The playback unit 300 may indicate the times when the peak value of a signal processing parameter (determined, for example, as an optimum signal processing parameter) is respectively detected by displaying a plurality of pointers on a progress bar of a multimedia player, which plays back a multimedia data. In this case, the playback unit 300 may allow the user to choose any of the peak detection times respectively indicated by the pointers, and to play back a portion of the multimedia data corresponding to the peak detection time chosen by the user. Alternatively, the playback unit 300 may represent an emotional event period as a bar, which is filled with various shades of color and is located above the progress bar. In this case, the playback unit 300 may allow the user to choose a location on the bar and to play back a portion of the multimedia data corresponding to the chosen location. This will hereinafter be described in further detail with reference to FIG. 10.

Figure 10:
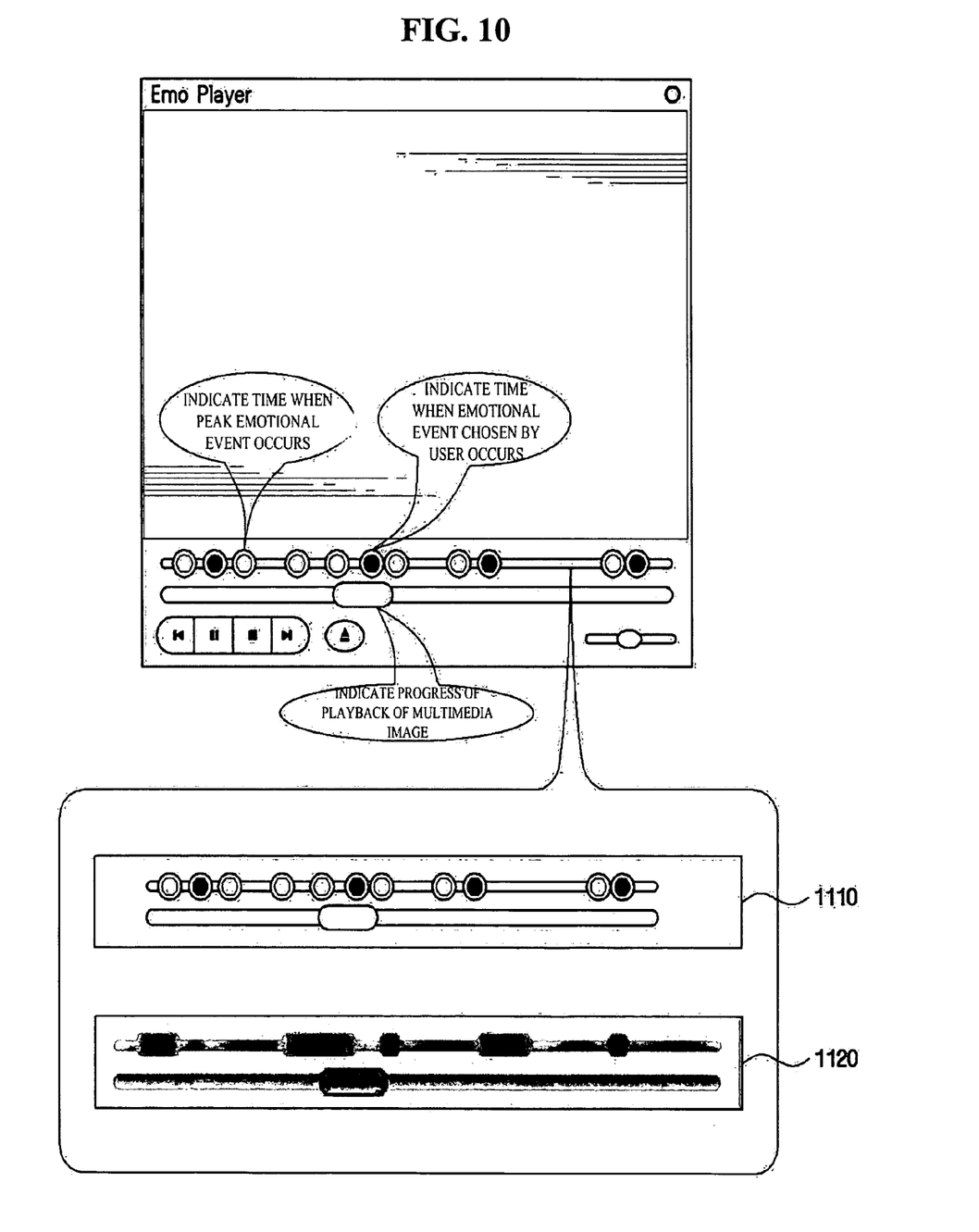
FIG. 10 is a diagram to explain the choosing of a location on a progress bar of a multimedia player and the playback of multimedia data corresponding to the location chosen by the user according to an embodiment of the present invention.

FIG. 10 is a diagram for explaining the choosing of a location on a progress bar of a multimedia player and the playback of multimedia data corresponding to the location chosen by the user according to an embodiment of the present invention. Referring to a progress bar window 1110 of FIG. 10, white circles represent the times when peak emotional events are respectively detected, and dark circles represent the times when emotional events chosen by the user are respectively detected. Referring to a progress bar window 1120 of FIG. 10, emotional event intensities are represented using shades of a color, and the user chooses any location on a progress bar so that multimedia data corresponding to the chosen location can be played back. In this case, a summarization level may not be able to be automatically set according to an emotional index. Here, the user may set the summarization level by directly typing in a desired summarization rate and a desired summarization time to a multimedia player. This will hereinafter be described in detail with reference to FIG. 11.

Figure 11:
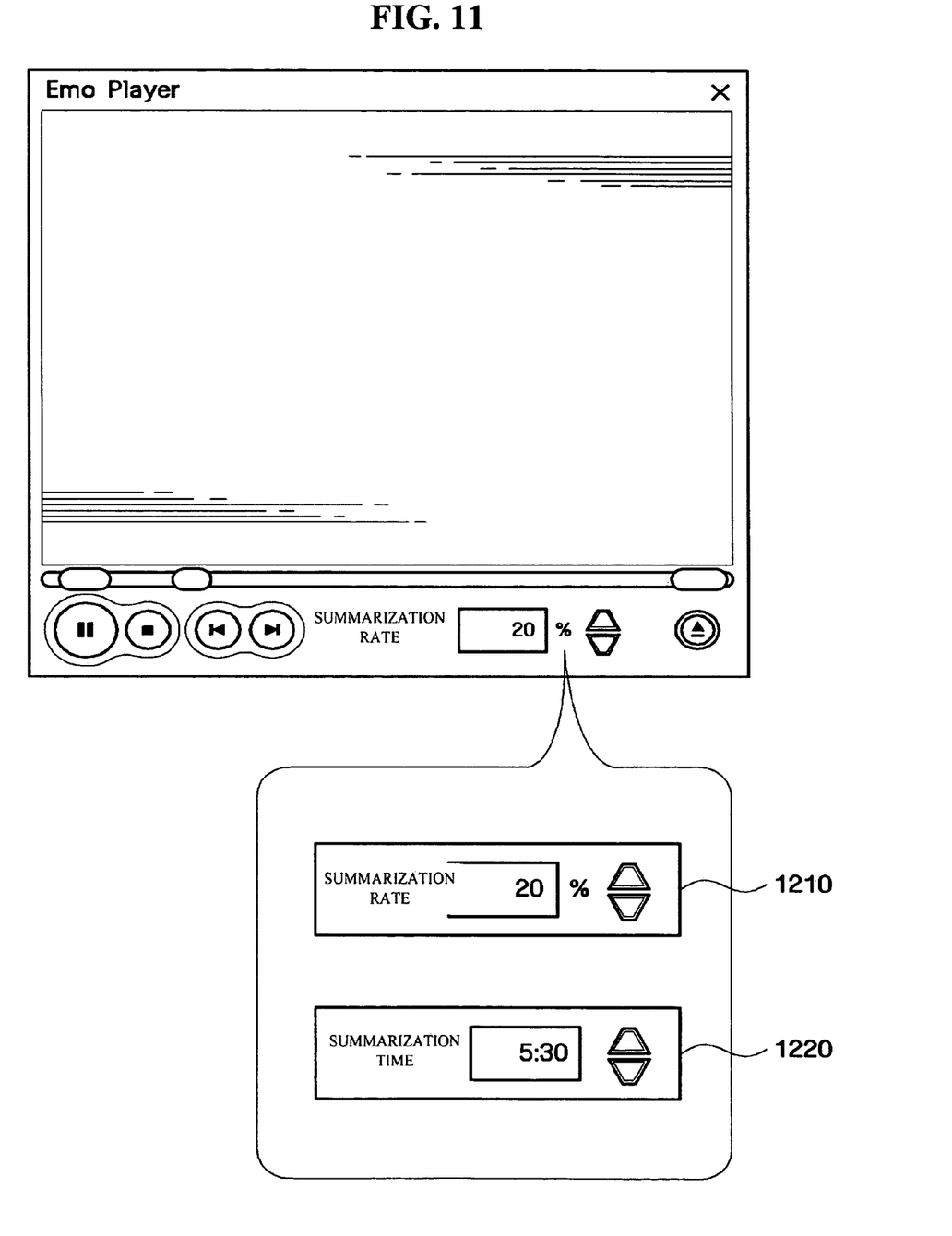
FIG. 11 is a diagram for explaining the setting of summarization level by directly typing in a desired summarization rate and a desired summarization time to a multimedia player according to an embodiment of the present invention.

FIG. 11 is a diagram to explain a method of setting summarization level by directly typing in a desired summarization rate and a desired summarization time to a multimedia player according to an embodiment of the present invention. Referring to FIG. 11, reference numeral 1210 represents a window to which a user can type in a desired summarization rate, and reference numeral 1220 represents a window to which the user can type in a desired summarization time.

In this disclosure, the terms 'unit', 'module', and 'table' refer to a software program or a hardware device (such as a field programmable gate array (FPGA) or an application specific integrated circuit (ASIC)) which performs a predetermined function. However, the present invention is not restricted to this. In particular, modules may be implemented in a storage medium which can be addressed or may be configured to be able to execute one or more processors. Examples of the modules include software components, object-oriented software components, class components, task components, processes, functions, attributes, procedures, sub-routines, program code segments, drivers, firmware, microcode, circuits, data, databases, data architecture, tables, arrays, and variables. The functions provided by components or modules may be integrated with one another so that they can executed by a smaller number of components or modules or may be divided into smaller functions so that they need additional components or modules. Also, components or modules may be realized to drive one ore more CPUs in a device.

A method of providing multimedia data according to an embodiment of the present invention will hereinafter be described in detail with reference to FIGS. 3 through 5.

Figure 3:
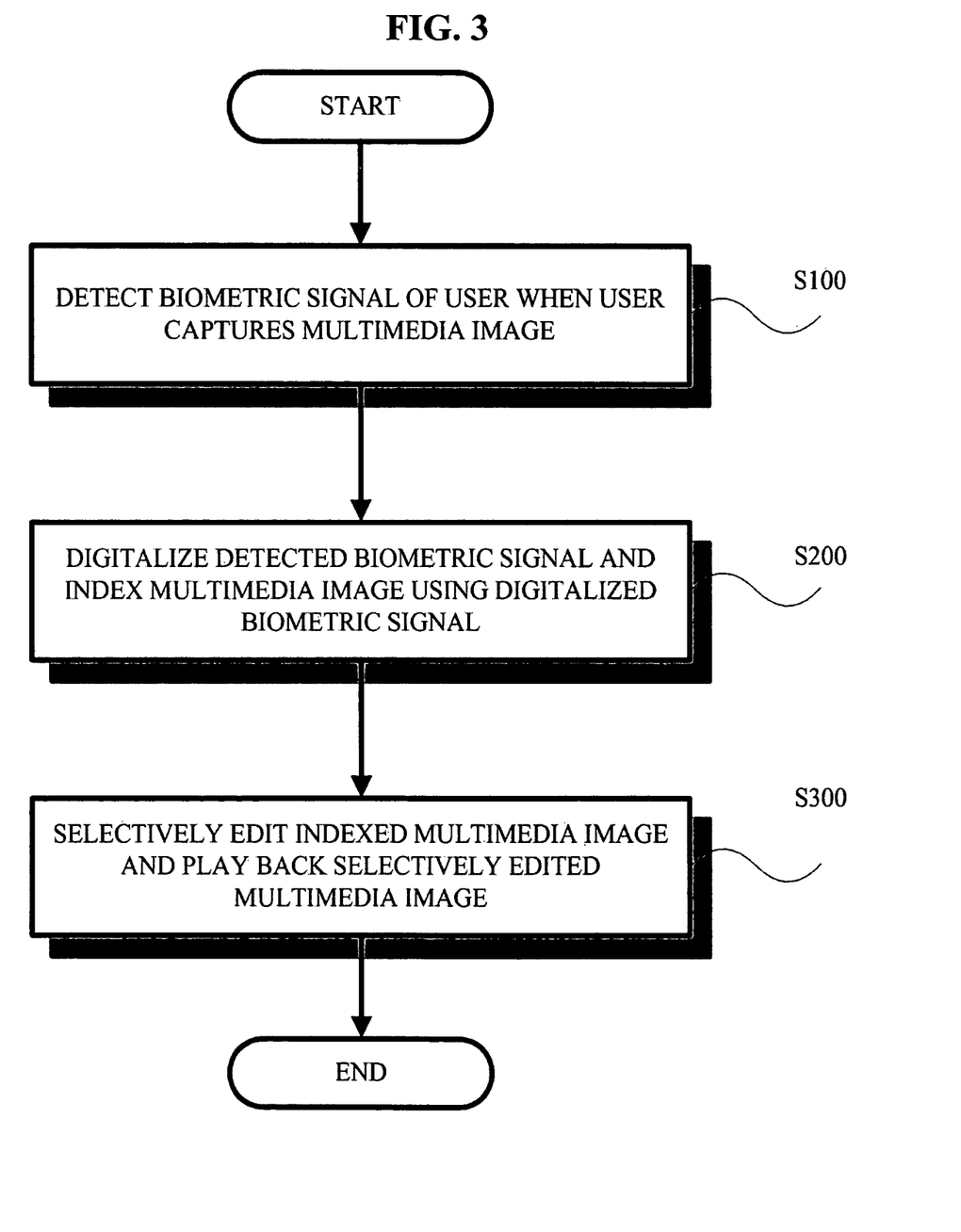
FIG. 3 is a flowchart illustrating a method of providing multimedia data using event indexes according to an embodiment of the present invention.

FIG. 3 is a flowchart illustrating a method of providing multimedia data using event indexes according to an embodiment of the present invention. Referring to FIG. 3, in operation S100, a biometric signal of a user is detected when the user captures a multimedia data. The detection of the biometric signal may be performed using a PPG sensor which is synchronized with a button used for capturing the multimedia data.

In operation S200, the detected biometric signal is digitized, and the multimedia data is indexed using the result of the result of the digitization. Operation S200 will hereinafter be described in further detail with reference to FIG. 4.

Figure 4:
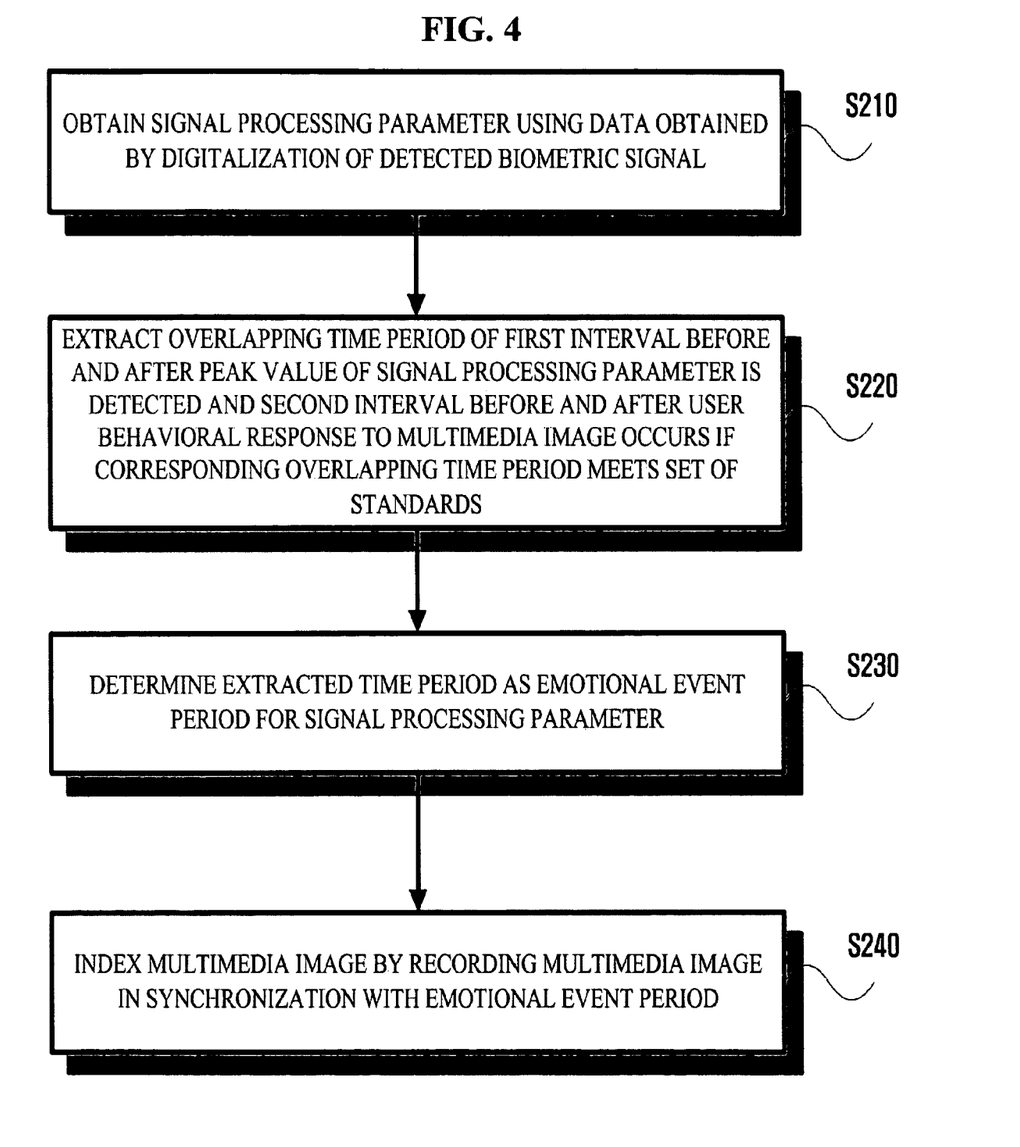
FIG. 4 is a flowchart illustrating the indexing of multimedia data, i.e., operation S200 illustrated in FIG. 3.

FIG. 4 is a flowchart illustrating the indexing of multimedia data, i.e., operation S200 illustrated in FIG. 3. Referring to FIG. 4, in operation S210, a signal processing parameter is obtained from the result of the digitization performed in operation S200 illustrated in FIG. 3. In operation S220, it is determined whether the overlapping time period of a first interval before and after the peak value of the signal processing parameter is detected and a second interval before and after a user behavioural response to the multimedia data occurs meets a set of standards. In operation S230, if the overlapping time period of the first interval before and after the peak value of the signal processing parameter is detected and the second interval before and after the user behavioural response to the multimedia data occurs is determined to meet the set of standards, the corresponding overlapping time period is determined as an emotional event period for the signal processing parameter. In operation S240, the multimedia data is indexed by recording the multimedia data in synchronization with the emotional event period determined in operation S230.

Here, a variety of sets of standards may be used in operation S220. According to the present embodiment, three standards, i.e., standards 1 through 3, may be used in operation S220, as described above. According to standard 1, the overlapping time period of the first interval before and after the peak value of the signal processing parameter is detected and a second interval before and after the user behavioural response to the multimedia data occurs is determined as an emotional event period for the signal processing parameter if the interval between the time when the corresponding user behavioural response is made by the user and the time when the peak value of the signal processing parameter is detected is less than a first value. The first value can be appropriately determined in consideration that the time when a biometric signal is detected is not likely to coincide with the time when a user behavioural response occurs due to the properties of the human body. For example, the first value may be about 5 msec. According to standard 2, the overlapping time period of the first interval before and after the peak value of the signal processing parameter is detected and the second interval before and after the user behavioural response to the multimedia data occurs is determined as an emotional event period for the signal processing parameter if the corresponding user behavioural response is made by the user prior to the detection of the peak value of the signal processing parameter and the interval between the time when the corresponding user behavioural response occurs and the time when the peak value of the signal processing parameter is detected is less than a second value. The second value, like the first value, may be about 5 msec. According to standard 3, the overlapping time period of the first interval before and after the peak value of the signal processing parameter is detected and the second interval before and after the user behavioural response to the multimedia data occurs is determined as an emotional event period for the signal processing parameter if a predetermined valid signal has been detected for the signal processing parameter, unlike for other signal processing parameters.

Referring to FIG. 3, in operation S300, the result of the indexing performed in operation S240 is selectively edited, and the result of the editing is played back. Operation S300 will hereinafter be described in further detail with reference to FIG. 5.

Figure 5:
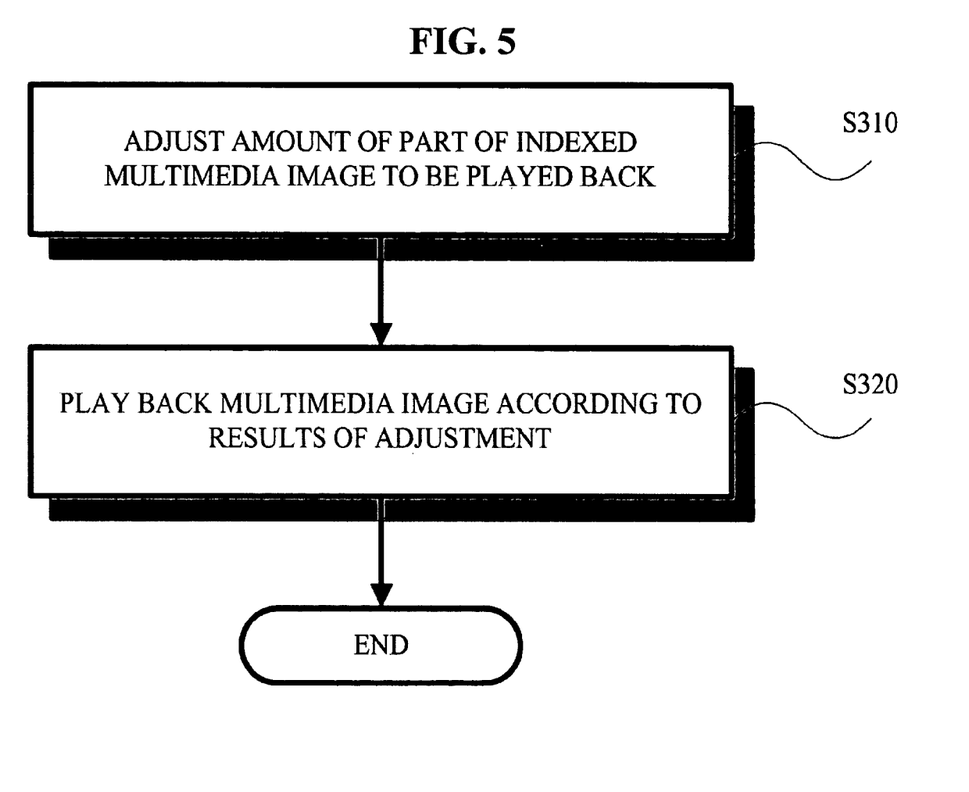
FIG. 5 is a flowchart illustrating the playback of an indexed multimedia data, i.e., operation S300 illustrated in FIG. 3.

FIG. 5 is a flowchart illustrating the selectively editing of indexed multimedia data and the playback of the edited multimedia data, i.e., operation S300 illustrated in FIG. 3. Referring to FIG. 5, in operation S310, it is determined how much of the indexed multimedia data obtained in operation S200 is to be played back, i.e., a summarization level is determined for the indexed multimedia data. In operation S320, the indexed multimedia data is played back according to the summarization level determined in operation S310.

Examples of the user behavioural response to the multimedia data include a variety of responses which can be made by the user when the user watches the multimedia data, for example, changes in the facial expression of the user or vocal responses. The signal processing parameter obtained in operation S210 may be SDNN10, which is a standard deviation of heartbeat intervals within ten seconds.

Operation S310 will become more apparent by referencing FIG. 8. Referring to FIG. 8, the summarization level may be adjusted using a GUI of a multimedia player. When the summarization level is varied, a playback-portion-to-non-playback-portion ratio represented by a progress bar is gradually or discontinuously varied, as described above with reference to FIG. 9.

Operation S320 will become more apparent by referencing FIG. 10. Referring to FIG. 10, the times when the peak value of the signal processing parameter obtained in operation S210 of FIG. 4 is respectively detected may be indicated by displaying a plurality of pointers on a progress bar of a multimedia player, which plays back the indexed multimedia data. In this case, when the user chooses any of the peak detection times respectively indicated by the pointers, a portion of the indexed multimedia data corresponding to the peak detection time chosen by the user is played back. Alternatively, an emotional event period is represented as a bar, which is filled with various shades of color and is located above the progress bar. In this case, when the user chooses a location on the bar, a portion of the indexed multimedia data corresponding to the chosen location is played back. As described above with reference to FIG. 11, the user may determine the summarization level by directly typing in a desired summarization rate and a desired summarization time to the multimedia player.

It is obvious to one of ordinary skill in the art to which the present invention pertains that a method and apparatus to provide multimedia data using event indexes and a computer-readable recording medium storing a computer program to execute the method of providing multimedia data using event indexes are all within the scope of the present invention.

According to the present invention, it is possible to facilitate the management of moving image files by indexing part of a moving image corresponding to an emotional event of a user who has captured the moving image, editing the moving image according to the results of the indexing, and playing back the edited moving image to provide a preview of the moving image.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of providing a moving image in a mobile device, comprising:
   detecting a biometric signal of a user of the mobile device while the user captures the moving image;
   digitizing the detected biometric signal and synchronizing the digitized biometric signal with the captured moving image;
   receiving an input for setting a threshold for the digitized biometric signal; and
   filtering out, based on the set threshold, at least a portion of the captured moving image,
   wherein the digitizing the detected biometric signal and synchronizing the digitized biometric signal with the captured moving image comprises:
      obtaining a signal processing parameter from the digitized biometric signal;
      comparing when a peak value of the signal processing parameter is detected with when a user behavioural response to the moving image occurs; and
      determining an emotional event period for the signal processing parameter based upon the comparison,
   wherein the user behavioural response to the moving image comprises a facial response and/or a vocal response made by the user.

2. The method of claim 1, further comprising:
   playing back a remaining portion of the moving image after the filtering out.

3. The method of claim 1, wherein the biometric signal of the user is detected by a sensor, the sensor is a photoplethysmography (PPG) sensor, and the detected biometric signal is synchronized with a button used for capturing the moving image.

4. The method of claim 1, wherein the digitizing the detected biometric signal and synchronizing the digitized biometric signal with the capture moving image further comprises:
   recording the moving image in synchronization with the emotional event period.

5. The method of claim 4, wherein the determining the emotional event period for the signal processing parameter comprises:
   determining whether an overlapping time period of a first interval before and after a peak value of the signal processing parameter is detected and a second interval before and after a user behavioral response to the moving image occurs meets a predetermined standard; and
   determining the overlapping time period of the first interval before and after the peak value of the signal processing parameter is detected and the second interval before and after the user behavioural response to the moving image occurs as the emotional event period for the signal processing parameter if the corresponding overlapping time period meets the predetermined standard.

6. The method of claim 5, wherein the predetermined standard is whether the interval between the time when the peak value of the signal processing parameter is detected and the time when the user behavioural response to the moving image occurs is within a predetermined value, which is determined in consideration of the characteristic of the human body in that the time when a biometric signal is detected is not likely to coincide with the time when a user behavioural response occurs.

7. The method of claim 6, wherein the signal processing parameter is SDNN10, which is a standard deviation of heartbeat intervals of the user within ten seconds.

8. The method of claim 5, wherein the predetermined standard is whether the time when the user behavioural response to the moving image occurs prior to the detection of the peak value of the signal processing parameter and the interval between the time when the peak value of the signal processing parameter is detected and the time when the user behavioural response to the moving image occurs is within a predetermined value.

9. The method of claim 8, wherein the signal processing parameter is SDNN10, which is a standard deviation of heartbeat intervals of the user within ten seconds.

10. The method of claim 5, wherein the filtering out comprises:
    adjusting the amount of the remaining part of the moving image after the filtering out, to be played back.

11. The method of claim 10, further comprises:
    playing back the remaining part of the moving image after the filtering out according to the results of the adjustment performed.

12. The method of claim 11, wherein the playing back comprises:
    indicating the times when the peak value of the signal processing parameter is respectively detected by displaying a plurality of pointers on a progress bar of a multimedia player, which plays back the moving image; and if the user chooses one of the peak value detection times respectively indicated by the pointers, playing back part of the moving image corresponding to the peak value detection time chosen by the user.

13. The method of claim 11, wherein the playing back comprises:

representing the emotional event period as a bar, which is filled with shades of a color and is located above a progress bar of a multimedia player, which plays back the moving image; and if the user chooses a location on the bar, playing back part of the moving image corresponding to the chosen location.

14. The method of claim 10, wherein the signal processing parameter is SDNN10, which is a standard deviation of heartbeat intervals of the user within ten seconds.

15. The method of claim 10, wherein the adjusting the amount of the remaining part of the moving image after the filtering out to be played back comprises adjusting a summarization level using a graphic user interface (GUI) of a multimedia player, which plays back the moving image, the summarization level representing the ratio of the length of the emotional event period and the length of the moving image.

16. The method of claim 15, wherein the adjusting the amount of the remaining part of the moving image after the filtering out to be played back comprises gradually or discontinuously varying the ratio of the amount of part of the moving image to be played-back and the amount of the filtered out part of the moving image not to be played back according to the summarization level, wherein the ratio is represented by a progress bar of the multimedia player.

17. The method of claim 16, wherein the user determines the summarization level by directly typing in a desired summarization rate and a desired summarization time to the multimedia player.

18. The method of claim 15, wherein the user determines the summarization level by directly typing in a desired summarization rate and a desired summarization time to the multimedia player.

19. The method of claim 5, wherein the signal processing parameter is SSNN10, which is a standard deviation of heartbeat intervals of the user within ten seconds.

20. The method of claim 4, wherein the signal processing parameter is SDNN10, which is a standard deviation of heartbeat intervals of the user within ten seconds.

21. The method of claim 1, wherein the moving image in synchronization with the digitized biometric signal is selectively edited and played back.

22. The method of claim 1, wherein the filtering out comprises summarizing the captured moving image in synchronization with the digitized biometric signal, using the set threshold.

23. A non-transitory computer-readable recording medium storing a computer program to execute the method of claim 1.

24. An apparatus for providing a moving image in a mobile device, comprising:

a biometric signal detection unit to detect a biometric signal of a user of the mobile device while the user captures the moving image;

an indexing unit to digitize the detected biometric signal and to synchronize the digitized biometric signal with the captured moving image;

a user interface to receive an input for setting a threshold for the digitized biometric signal; and a playback unit to filter out, based on the set threshold, at least a portion of the captured moving image, wherein the indexing unit comprises:

a parameter calculator to obtain a signal processing parameter from the digitized biometric signal; and an event period generator to determine an emotional event period for the signal processing parameter, wherein the event period generator:

compares when a peak value of the signal processing parameter is detected with when a user behavioural response to the moving image occurs; and determines an emotional event period for the signal processing parameter based upon the comparison, wherein the user behavioural response to the moving image comprises a facial response and/or a vocal response made by the user.

25. The apparatus of claim 24, wherein the detecting unit includes a sensor to detect the biometric signal of the user, wherein the sensor is a photoplethysmography (PPG) sensor and the biometric signal is synchronized with a button used for capturing the moving image.

26. The apparatus of claim 25, wherein the indexing unit further comprises:

a synchronization recorder which records the moving image in synchronization with the emotional event period.

27. The apparatus of claim 26, wherein the event period generator determines the emotional event period by determining whether an overlapping time period of a first interval before and after a peak value of the signal processing parameter is detected and a second interval before and after a user behavioural response to the moving image occurs meets a predetermined standard; and determines the overlapping time period of the first interval before and after the peak value of the signal processing parameter is detected and the second interval before and after the user behavioural response to the moving image occurs as the emotional event period for the signal processing parameter if the corresponding overlapping time period meets the predetermined standard.

28. The apparatus of claim 27, wherein the predetermined standard is whether the interval between the time when the peak value of the signal processing parameter is detected and the time when the user behavioural response to the moving image occurs is within a predetermined value, which is determined in consideration of the characteristic of the human body in that the time when a biometric signal is detected is not likely to coincide with the time when a user behavioural response occurs.

29. The apparatus of claim 28, wherein the signal processing parameter is SSNN10, which is a standard deviation of heartbeat intervals of the user within ten seconds.

30. The apparatus of claim 27, wherein the predetermined standard is whether the time when the user behavioural response to the moving image occurs prior to the detection of the peak value of the signal processing parameter and the interval between the time when the peak value of the signal processing parameter is detected and the time when the user behavioural response to the moving image occurs is within a predetermined value.

31. The apparatus of claim 30, wherein the signal processing parameter is SSNN10, which is a standard deviation of heartbeat intervals of the user within ten seconds.

32. The apparatus of claim 27, wherein the playback unit comprises an adjustment unit which adjusts the amount of a remaining part of the moving image after the filtering out, to be played back,
wherein the playback unit plays back the moving image according to the results of the adjustment performed by the adjustment unit.

33. The apparatus of claim 32, wherein the signal processing parameter is SDNN10, which is a standard deviation of heartbeat intervals of the user within ten seconds.

34. The apparatus of claim 32, wherein the adjustment unit adjusts a summarization level using a graphic user interface (GUI) of a multimedia player, which plays back the moving image, wherein the summarization level represents the ratio of the length of the emotional event period and the length of the moving image.

35. The apparatus of claim 34, wherein the adjustment unit gradually or discontinuously varies the ratio of the amount of the remaining part of the moving image after the filtering out to be played back and the amount of the filtered out part of the moving image not to be played back according to the summarization level, wherein the ratio is represented by a progress bar of the multimedia player.

36. The apparatus of claim 35, wherein the user determines the summarization level by directly typing in a desired summarization rate and a desired summarization time to the multimedia player.

37. The apparatus of claim 34, wherein the user determines the summarization level by directly typing in a desired summarization rate and a desired summarization time to the multimedia player.

38. The apparatus of claim 32, wherein the playback unit indicates the times when the peak value of the signal processing parameter is respectively detected by displaying a plurality of pointers on a progress bar of a multimedia player, which plays back the moving image; and if the user chooses one of the peak value detection times respectively indicated by the pointers, plays back part of the moving image corresponding to the peak value detection time chosen by the user.

39. The apparatus of claim 32, wherein the playback unit represents the emotional event period as a bar, which is filled with shades of a color and is located above a progress bar of a multimedia player, which plays back the moving image; and if the user chooses a location on the bar, playing back part of the moving image corresponding to the chosen location.

40. The apparatus of claim 27, wherein the signal processing parameter is SSNN10, which is a standard deviation of heartbeat intervals of the user within ten seconds.

41. The apparatus of claim 26, wherein the signal processing parameter is SSNN10, which is a standard deviation of heartbeat intervals of the user within ten seconds.

42. The apparatus of claim 24, wherein the moving image in synchronization with the digitized biometric signal is selectively edited and played back.

43. A method of recording and/or replaying a moving image in a mobile device, comprising:
detecting a biometric signal of a user while the user captures the moving image;
digitizing the detected biometric signal;
synchronizing the digitized biometric signal with the moving image;
receiving an input for setting a threshold for the digitized biometric signal; and
filtering out, based on the set threshold, at least a portion of the captured moving image;
recording the captured moving image with the digitized biometric signal in synchronization with the moving image; and
selectively replaying the moving image, by using the result of the filtering out,
wherein the digitizing the detected biometric signal and synchronizing the digitized biometric signal with the moving image comprises:
obtaining a signal processing parameter from the digitized biometric signal;
comparing when a peak value of the signal processing parameter is detected with when a user behavioural response to the moving image occurs; and
determining an emotional event period for the signal processing parameter based upon the comparison,
wherein the user behavioural response to the moving image comprises a facial response and/or a vocal response made by the user.

44. The method of claim 43, wherein the filtering out comprises filtering out the captured moving image automatically.

45. The method of claim 43, wherein in the biometric signal is a heart rate signal of the user of the mobile device.

46. The method of claim 43, wherein the biometric signal of the user of the mobile device is detected by using a sensor, the sensor is a Photoplethysmography (PPG) sensor.

47. A mobile apparatus for providing a moving image, comprising:
a biometric signal detection unit to detect a biometric signal of a user of the mobile apparatus, while the user captures the moving image;
an indexing unit to digitize the detected biometric signal and to index the captured moving image using the digitized biometric signal;
a user interface to receive an input for setting a threshold for the digitized biometric signal; and
a playback unit to filter out, based on the set threshold, at least a portion of the indexed moving image, and to play back only the remaining portion of the moving image after the filtering out,
wherein the playback unit filters out a portion of the indexed moving image, if the digitized biometric signal intensity in synchronization with the portion is less than the set threshold,
wherein the indexing unit comprises:
a parameter calculator to obtain a signal processing parameter from the digitized biometric signal; and
an event period generator to determine an emotional event period for the signal processing parameter, wherein the event period generator:
compares when a peak value of the signal processing parameter is detected with when a user behavioural response to the moving image occurs; and
determines an emotional event period for the signal processing parameter based upon the comparison,
wherein the user behavioural response to the moving image comprises a facial response and/or a vocal response made by the user.

48. A method of recording and/or reproducing a moving image using a mobile device, comprising:
detecting a biometric signal of a user of the mobile device, while the user captures the moving image;
digitizing the detected biometric signal;
synchronizing the digitized biometric signal with the captured moving image;
receiving an input for setting a threshold for the digitized biometric signal;

filtering out, based on the set threshold, at least a portion of the captured moving image; selectively recording the captured moving image in synchronization with the digitized biometric signal; and reproducing the recorded moving image, wherein the digitizing the detected biometric signal and synchronizing the digitized biometric signal with the moving image comprises:

obtaining a signal processing parameter from the digitized biometric signal;

comparing when a peak value of the signal processing parameter is detected with when a user behavioural response to the moving image occurs; and determining an emotional event period for the signal processing parameter based upon the comparison, wherein the user behavioural response to the moving image comprises a facial response and/or a vocal response made by the user.

49. An apparatus for recording and/or playing back a moving image, comprising:

a sensor;

a biometric signal detection unit to detect a biometric signal of a user of the apparatus using the sensor while the user captures a moving image;

an indexing unit to digitize the detected biometric signal and to index the captured moving image by synchronizing the digitized biometric signal with the captured moving image, while recording the captured moving image;

a user interface to receive an input for setting a threshold for the digitized biometric signal;

an editing unit to filter out a portion of the indexed moving image, based on the set threshold; and a playback unit to vary the playback time of the moving image using the digitized biometric signal in synchronization with the moving image, wherein the editing unit filters out a portion of the indexed moving image, if the synchronized digitized biometric signal intensity of the portion is less than the set threshold, wherein the indexing unit comprises:

a parameter calculator to obtain a signal processing parameter from the digitized biometric signal; and an event period generator to determine an emotional event period for the signal processing parameter, wherein the event period generator:

compares when a peak value of the signal processing parameter is detected with when a user behavioural response to the moving image occurs; and determines an emotional event period for the signal processing parameter based upon the comparison, wherein the user behavioural response to the moving image comprises a facial response and/or a vocal response made by the user.

* * * * *